United States Patent [19]

Bernal

[11] 4,399,156
[45] Aug. 16, 1983

[54] READILY PORTABLE BURRITO

[75] Inventor: Eddle L. Bernal, Defiance, Ohio

[73] Assignee: Taco Operations, Inc., Defiance, Ohio

[21] Appl. No.: 342,380

[22] Filed: Jan. 25, 1982

[51] Int. Cl.³ .................. A21D 13/00; A23L 1/00
[52] U.S. Cl. .................................. 426/91; 426/92; 426/94; 426/134; 426/138
[58] Field of Search .............. 426/134, 297, 91, 92, 426/94, 138, 391, 283, 421, 110, 523; 99/450.1, 450.6

[56] References Cited

U.S. PATENT DOCUMENTS

| | | | |
|---|---|---|---|
| 1,778,485 | 10/1930 | Davidson | 426/134 |
| 2,589,823 | 3/1952 | Krens | 426/91 |
| 3,143,424 | 8/1964 | Wilson | 426/94 |
| 3,410,691 | 11/1968 | Stanley | 426/94 |
| 3,615,678 | 10/1971 | Tangel et al. | 426/297 |
| 3,656,968 | 4/1972 | Allen | 426/283 |
| 3,669,007 | 6/1972 | Pulici | 99/450.6 |
| 3,782,966 | 1/1974 | Forkner | 426/94 |
| 3,804,956 | 4/1974 | Bongiovanni | 426/134 |
| 3,904,772 | 9/1975 | Moegle | 426/92 |
| 4,084,493 | 4/1978 | Quintana | 99/450.6 |
| 4,139,644 | 2/1979 | Stephenson | 426/523 |
| 4,144,356 | 3/1979 | McDaniel | 426/91 |

FOREIGN PATENT DOCUMENTS 786217  11/1957  United Kingdom ................. 426/91

Primary Examiner—Steven L. Weinstein
Attorney, Agent, or Firm—Allen D. Gutchess, Jr.

[57] ABSTRACT

A highly portable Mexican-type food item is provided and more specifically a burrito-type product on a stick. Burritos consist essentially of a highly pliable, soft tortilla wrapped around a burrito food filler. The new burrito includes a self-sustaining tortilla with an edge portion thereof wrapped around a stick or other suitable elongate member which is grasped by the customer, with food filler being enclosed within the remaining portion of the tortilla and with the ends thereof turned in. The portability of the burrito product thus approaches that of an ice cream bar or a coated hot dog having a stick impaled in one end thereof, for example.

15 Claims, 9 Drawing Figures

READLY PORTABLE BURRITO

This invention relates to a portable food item and more particularly to a Mexican-type food item including a burrito mounted on an elongate member.

With increased popularity in Mexican food, burritos have kept an equal, if not a faster, pace. Burritos are made of a soft, highly pliable tortilla in a generally cylindrical shape which is wrapped around a burrito food filler. The filler usually includes seasoned meat or beans but, more recently, other food fillers have also been used, including such items as fruit. With the tortilla being soft and pliable, and the filler being squishy, if not juicy, of practical necessity, the burrito must be eaten on a plate. Consequently, burritos are usually sold by restaurants with dine-in facilities or purchased only by customers taking them home to eat.

The present invention provides a highly portable burrito product which can be carried about and eaten as easily as an ice cream bar or a coated hot dog impaled on a stick, commonly known as a corn dog, by way of example.

The portable Mexican-type food item includes a burrito-type product affixed to an elongate member or stick extending therefrom and intended to be grasped by the consumer during consumption of the product. The burrito-type product includes a tortilla wrapped on itself to form a chamber enclosing a food filler with the tortilla being in a semi-rigid, self-sustaining state so as to maintain a stiff, upright position when only a lower portion thereof is supported by the elongate member. The tortilla is affixed to the elongate member or stick with about half the length of the member projecting from an edge of the tortilla and with the stick enclosed in about half the length of the wrapped tortilla. The stick provides some lengthwise support for the burrito product along with the self-sustaining nature of the tortilla, which is achieved through the cooking process employed.

In the making of the portable Mexican food item, a soft pliable tortilla, which commonly is made with white flour or cornmeal, is provided in a generally circular shape and laid flat on a suitable supporting surface. The elongate member or stick is then placed near a peripheral edge of the tortilla with about half the stick juxtapositioned thereon. The portion of the tortilla between the edge and the stick is then folded back over the stick with the edge laying beyond the stick. The stick and contiguous portions of the tortilla on each side thereof are then turned 180° over the edge portion of the tortilla previously extending beyond the stick and the turning step is then repeated to provide three layers of the tortilla on each side of the stick. A burrito food filler is then placed on the flat surface of the tortilla adjacent the wrapped portion and the stick and the peripheral edge of the tortilla opposite the edge originally adjacent the stick is then wrapped around the food filler and the first wrapped portion of the tortilla to form an open-ended, generally cylindrical chamber around the food filler. The edge of the tortilla preferably extends beyond the wrapped portion in an overlapping relationship with a portion of the tortilla adjacent the food filler. Edge portions of the tortilla adjacent the ends of the chamber are then turned in to form an enclosed chamber around the food filler.

The overlapped portion of the tortilla is then fastened to the inner portion by suitable means, such as a toothpick, which extends completely through the overlapped portions of the tortilla to hold it firmly in position. The resulting uncooked product is then placed in a hot liquid and cooked. The liquid can be a hot oil in which the uncooked product is immersed where it remains until it floats to the surface, indicating that it is done. The tortilla at this time has attained a self-sustaining state and it will remain substantially rigid even when held in an upright position by the exposed portion of the elongate member or stick. The fastener or toothpick is then removed and the product is ready for sale and consumption.

It is, therefore, a principal object of the invention to provide a highly portable Mexican food item and a method for making same.

Another object of the invention is to provide a burrito-type food product which can be carried about and eaten without the aid of a plate or other supporting surface.

Many other objects and advantages of the invention will be apparent from the following detailed description of a preferred embodiment thereof, reference being made to the accompanying drawing, in which.

Figure 1:
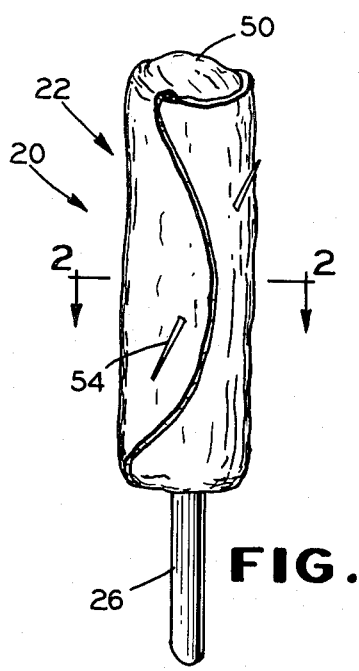
FIG. 1 is a view in perspective of a burrito-type food product in accordance with the invention.
Figure 2:
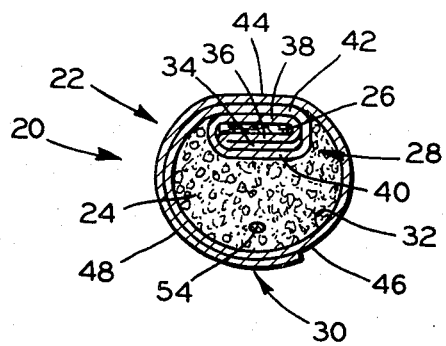
FIG. 2 is a view in transverse cross section taken along the line 2—2 of FIG. 1.

Referring to the drawings, and particularly to FIGS. 1 and 2, a burrito-type food product in accordance with the invention is indicated at 20. The burrito product basically includes a tortilla 22 with a food filler 24 and an elongate carrying member or stick 26 projecting downwardly. The tortilla 22 has a closely wrapped portion 28 around the stick 26 and an outer wrapped portion 30 spaced around the wrapped portion 28 and forming a generally cylindrical chamber 34 for the food filler 24.

The closely wrapped portion 28 of the tortilla 22 includes three layers on each side of the stick 26, the layers being designated 34, 38, 40, 42 and 44. These layers are supported by the inner portion of the stick 26, constituting about one-half of its length, with the layers forming a structural core extending beyond the end of the stick to the edge of the product, with the extended core approximately equaling the length of the portions of the layers wrapped around the stick 26.

Figure 9:
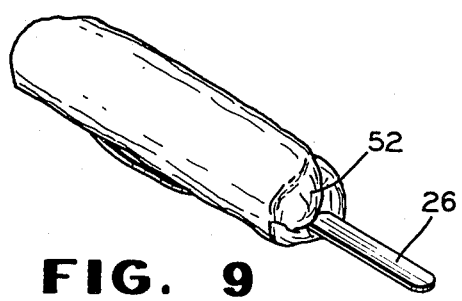

The outer wrapped portion 30 of the tortilla 22 includes an inner layer 46 extending from the layer 42 around the food filler 24 to the layer 44 and then beyond the layer 44 to an outer overlapping layer 48. An upper end 50 of the outer wrapped portion 30 of the tortilla is turned in to enclose one end of the chamber 32, as shown in FIG. 1. Somewhat similarly, a lower end 52 of the wrapped portion 30 of the tortilla is turned in, as shown in FIG. 9, to enclose the other end of the chamber 32. The food filler 24 is thus completely enclosed by portions of the tortilla 22 when the burrito product is being cooked and before it is eaten.

A temporary fastener 54, which can be in the form of a toothpick or the like, holds the tortilla 22 temporarily in place, until after it is cooked and achieves a self-sustaining state. The fastener 54 preferably extends through the layer 46, through the food filler 44, and through another portion of the layer 46 and the outer layer 48 of the tortilla, also being on a diagonal to hold longitudinally spaced portions of the tortilla layers 46 and 48 in place.

Figure 3:
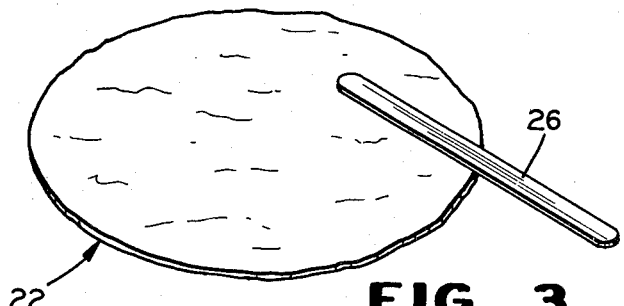
FIGS. 3-9 are somewhat schematic views in perspective showing the steps for making the burrito-type product in accordance with the invention.

In producing the food product, the generally-circular tortilla 22 is laid on a suitable flat surface and the elongate stick 26 is positioned thereon, as shown in FIG. 3. The stick is placed in a chordal position with about half of its length overlaying the tortilla and about half projecting beyond the peripheral edge thereof. The maximum distance of the stick from the tortilla edge in a radial direction is about one-fourth the diameter of the tortilla.

Figure 4:
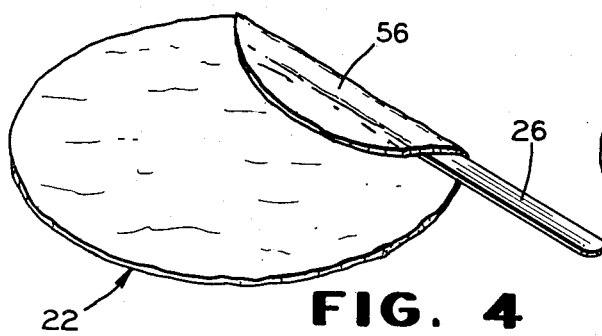

Next, an edge portion 56 of the tortilla at the side of the stick 26 is turned over (FIG. 4) the upper surface of the stick 26, which is noncircular, and preferably substantially rectangular in transverse cross section. This portion 56 is of sufficient size that it extends beyond the stick a distance approximating the width of the stick.

Figure 5:
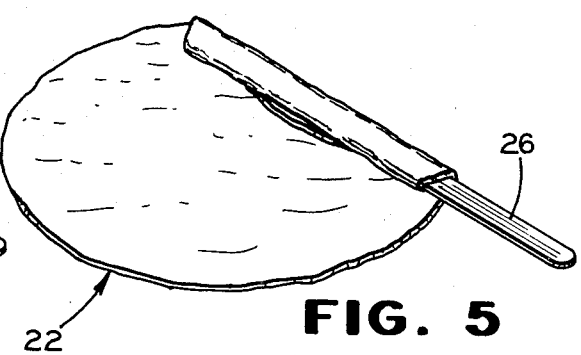

The stick is next turned 180° in a counterclockwise direction, as shown in FIG. 5. This causes the portion 56 to be doubled back and forms the layers 34 and 36 (FIG. 2) on the one side of the stick 26, along with the layer 38 on the other side of the stick.

Figure 6:
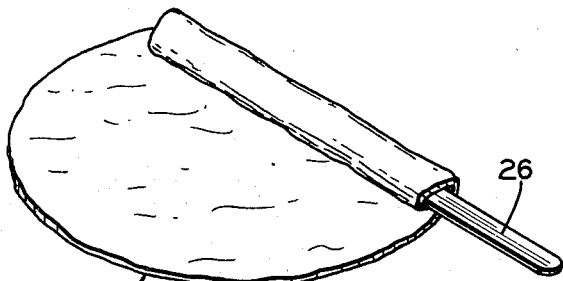

Referring to FIG. 6, the stick 26 is then turned another 180° in the counterclockwise direction to form the third layer 40 on the one side of the stick and the second layer 42 on the other side of the stick. The remaining flat portion of the tortilla 22 now constitutes about one-half to two-thirds of the overall area of the tortilla.

Figure 7:
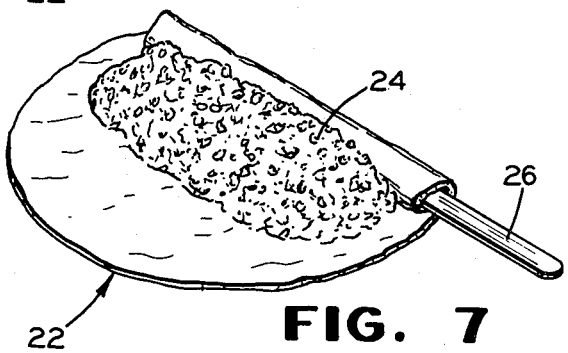
Figure 8:
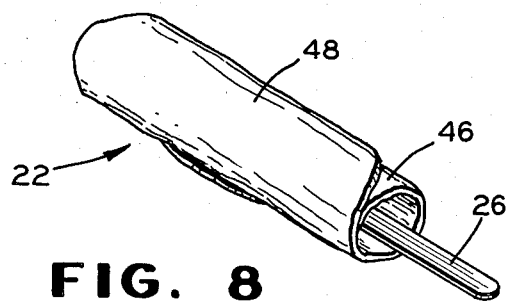

Referring to FIG. 7, a predetermined amount of the food filler 24 is deposited on the area contiguous with the wrapped portion around the stick. The food filler usually basically consists of seasoned meat or beans but widely divergent variations thereof, even including fruits, have been employed in burritos. In any instance, the food filler 24 characteristically is rather juicy or at least of squishy consistency.

The outer wrapped portion 30 of the tortilla 22 is then wrapped around the filler 24 and preferably beyond the portion of the tortilla wrapped around the stick to form the inner layer 46 of the wrapped portion 30, the third layer 44 (FIG. 2) of the wrapped portion 28, and the outer layer 48. Preferably, the layer 48 of the wrapped portion 30 extends substantially beyond the layer 44, in overlapping relationship with the inner layer 46, to provide greater structural integrity for the outer walls of the chamber 32.

The upper edge of the tortilla is then turned in to form the end wall 50 of FIG. 1 and the lower edge of the tortilla is similarly turned in to form the lower end wall 52 of FIG. 9, thereby closing off the ends of the chamber 32 to completely enclose the food filler 24. The temporary fastener 54 is then inserted through the tortilla product as described above.

At this point, the tortilla 22 still retains its highly pliable, soft state and would quickly fall apart if one attempted to lift it by the exposed portion of the stick 26. However, the product is then cooked in a manner to cause the tortilla 22 to obtain a semi-rigid, self-sustaining state. In that state, the tortilla is not as crisp as a cooked taco shell, for example, but is in an intermediate state of hardness between a cooked taco shell and the original, soft, pliable tortilla. It can be described as having a hardness similar to that of a crescent roll, for want of a better definition.

A preferred manner of achieving this state is by immersing the assembled item in hot liquid. A suitable container of hot cooking oil at a temperature from approximately 325° to 375° F. and preferably about 350° F. is employed. The burrito item is then immersed in the hot oil until it rises to the surface thereof, which indicates that it is done. The item is then removed from the oil and the fastener 54 extracted to achieve the final burrito-type product 20 ready for sale and consumption. The product can then be eaten from the upper end 50 down and the consumer can carry it about while doing so. During the cooking process, the tortilla swells slightly so that the wrapped portion 28 tightly engages the stick.

Various modifications of the above described embodiment of the invention will be apparent to those skilled in the art, and it is to be understood that such modifications can be made without departing from the scope of the invention, if they are within the spirit and the tenor of the accompanying claims.

I claim:

1. A portable food item comprising a tortilla, a substantially rigid and self-supporting elongate member capable of being hand held and supporting the tortilla, said elongate member having a substantial portion of its length projecting beyond an edge of said tortilla with the remaining portion of the member having an edge portion of the tortilla affixed thereto by being wrapped completely therearound from said edge portion of said tortilla toward an opposite edge portion thereof, with the remaining portion of the tortilla constituting at least one half of the tortilla forming a chamber contiguous with the wrapped portion, a food filler contained within said chamber, and said tortilla having edge portions at the ends of said chamber closed off to enclose the food filler, said tortilla being at least partially cooked and in a semi-rigid, self-sustaining state.

2. A food item according to claim 1 wherein said food filler is selected from the group consisting of beans and meat.

3. A food item according to claim 1 wherein the portion of the tortilla which is wrapped around the elongate member forms at least two layers on opposite sides of the elongate member.

4. A portable food item according to claim 3 characterized by said layers of said tortilla on opposite sides of the elongate member extending beyond the end of the elongate member to the edge of the tortilla.

5. A food item according to claim 1 characterized by said remaining portion of the tortilla forming the chamber being in substantially overlapped relationship.

6. A food item according to claim 1 characterized by the elongate member extending into the wrapped portion of the tortilla about half the length of the wrapped portion.

7. A food item according to claim 1 characterized by said tortilla being of generally circular shape, when flat.

8. A food item according to claim 1 characterized by said chamber being generally cylindrical in shape.

9. A portable food product according to claim 1 characterized by said tortilla having a state of hardness between a cooked taco shell and an uncooked soft, pliable tortilla.

10. A portable food item according to claim 1 characterized by said tortilla having a hardness similar to that of a crescent roll.

11. A food item according to claim 1 wherein said elongate member is of non-circular shape in transverse cross section.

12. A portable food item according to claim 1 characterized by said tortilla being swollen slightly in its cooked state from its original state so that the wrapped portion thereof tightly engages said elongate member.

13. A portable food item according to claim 1 characterized by said remaining portion of said tortilla constituting from one-half to two-thirds of said tortilla.

14. A portable Mexican-type food item comprising an at least partially cooked tortilla in a semi-rigid, self-sustaining state, a substantially rigid and self-supporting elongate member capable of being hand-held and supporting the tortilla, said elongate member being non-circular in transverse cross section, said elongate member having a substantial portion of its length projecting beyond an edge of the tortilla with the remaining portion of the elongate member having an edge portion of the tortilla affixed thereto by being wrapped therearound from the one edge portion toward an opposite edge portion, with said wrapped portion of said tortilla constituting from about one-third to about one-half of said tortilla, the remaining portion of said tortilla forming a chamber contiguous with the wrapped portion of generally cylindrical shape with said opposite edge portion of said tortilla being in overlapped relationship with a portion of the tortilla adjacent the wrapped portion, the wrapped portion of the tortilla extending substantially beyond the wrapped end of said elongate member, said remaining portion of said tortilla having edge portions at the ends of said chamber closed off to enclose the chamber, and a food filler located within said chamber.

15. A portable Mexican-type food item according to claim 14 wherein the portion of the tortilla which is wrapped around the elongate member forms at least two layers on opposite sides of said elongate member with said tortilla being slightly swelled in its cooked state from its original state to cause said layers to be tightly adhered to said elongate member.

* * * * *